US012784625B1

(12) United States Patent
Guan et al.

(10) Patent No.: US 12,784,625 B1
(45) Date of Patent: Nov. 3, 2026

(54) DISPLAY MULTI-LINE CROSSTALK COMPENSATION

(71) Applicant: Apple Inc., Cupertino, CA (US)

(72) Inventors: Ximeng Guan, San Jose, CA (US); Dustin Y Wai, Sunnyvale, CA (US); Yu-Ching Yeh, Sunnyvale, CA (US); Yang Li, San Jose, CA (US); Jesun Kim, Cupertino, CA (US); Sheng Zhang, Saratoga, CA (US); Pubudu Galwaduge, Sunnyvale, CA (US); Jie Won Ryu, San Jose, CA (US); Hyunwoo Nho, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/959,066

(22) Filed: Nov. 25, 2024

Related U.S. Application Data

(60) Provisional application No. 63/574,663, filed on Apr. 4, 2024.

(51) Int. Cl.
*G09G 3/20* (2006.01)

(52) U.S. Cl.
CPC ....... *G09G 3/20* (2013.01); *G09G 2310/0262* (2013.01); *G09G 2310/08* (2013.01); *G09G 2320/0209* (2013.01)

(58) Field of Classification Search
None
See application file for complete search history.

(56) References Cited

U.S. PATENT DOCUMENTS

| | | | | |
|---|---|---|---|---|
| 8,077,240 | B2 | 12/2011 | Ellis-Monaghan et al. | |
| 9,521,346 | B1 | 12/2016 | Cugler-Fiorante et al. | |
| 9,761,188 | B2 | 9/2017 | Zheng et al. | |
| 9,916,801 | B2 | 3/2018 | Lin et al. | |
| 11,205,363 | B2 | 12/2021 | Choi et al. | |
| 11,295,678 | B2 | 4/2022 | Zheng et al. | |
| 2010/0110114 | A1 * | 5/2010 | Hashimoto | G09G 3/3614 345/88 |

(Continued)

FOREIGN PATENT DOCUMENTS

| | | | |
|---|---|---|---|
| CN | 106710538 | A | 5/2017 |
| CN | 112397564 | A | 2/2021 |

(Continued)

OTHER PUBLICATIONS

Espacenet translation of CN117499798A Published Feb. 2, 2024 (Year: 2024).*

(Continued)

*Primary Examiner* — Donna V Bocar
(74) *Attorney, Agent, or Firm* — Treyz Law Group, P.C.; Tianyi He

(57) ABSTRACT

An electronic device may include a display. The display have a shared data line display configuration in which pixels in a given row may be programmed with pixel values in different programming phases during a line time for the given row. The shared data line may experience inter-line toggling of pixel values and inter-phase toggling of pixel values. Display driver circuitry for the display may include crosstalk compensation circuitry that performs compensation for the pixel values to account for crosstalk resulting from the inter-line toggling and the inter-phase toggling.

20 Claims, 9 Drawing Sheets

(56) References Cited

U.S. PATENT DOCUMENTS

| | | | | |
|---|---|---|---|---|
| 2012/0281030 A1* | 11/2012 | Miyata | G09G 3/3688 | 345/690 |
| 2017/0236484 A1* | 8/2017 | Zheng | G09G 3/3655 | 345/212 |
| 2020/0251038 A1* | 8/2020 | Chien | G09G 5/395 | |

FOREIGN PATENT DOCUMENTS

| | | | | | |
|---|---|---|---|---|---|
| CN | 117499798 | A | * | 2/2024 | H04N 25/10 |
| CN | 118197197 | A | | 6/2024 | |
| EP | 3367374 | A1 | | 8/2018 | |
| JP | 2009139671 | A | | 6/2009 | |

OTHER PUBLICATIONS

Espacenet translation of CN118197197 Published Jun. 14, 2024 (Year: 2024).*

* cited by examiner

DISPLAY MULTI-LINE CROSSTALK COMPENSATION

This application claims the benefit of U.S. provisional patent application No. 63/574,663, filed Apr. 4, 2024, which is hereby incorporated by reference herein in its entirety.

FIELD

This relates generally to electronic devices and, more particularly, to electronic devices with displays.

BACKGROUND

Electronic devices often include displays that provide visual content to the viewers. A display can include an array of display pixels such as organic light-emitting diode display pixels or liquid crystal display pixels. Display driver circuitry coupled to the array of display pixels can control the operation of the array of display pixels.

SUMMARY

An electronic device may include a display. The display have a shared data line display configuration in which pixels in a given row may be programmed with pixel values in different programming phases during a line time for the given row. The shared data line may experience inter-line toggling of pixel values and inter-phase toggling of pixel values. Display driver circuitry for the display may include crosstalk compensation circuitry that performs compensation for the pixel values to account for crosstalk resulting from the inter-line toggling and the inter-phase toggling.

In one illustrative arrangement, a display may include a first pixel arranged in a first column of a pixel array, a second pixel arranged in a second column of the pixel array, a data line coupled to the first and second pixels, and display driver circuitry coupled to the data line. The display driver circuitry may be configured to perform pixel value loading for the first pixel using the data line and perform pixel value loading for the second pixel using the data line. The data line may exhibit a toggling between a first pixel value for the first pixel and a second pixel value for the second pixel. The display driver circuitry may include crosstalk compensation circuitry that performs compensation for crosstalk caused by the toggling between the first and second pixel values.

In one illustrative arrangement, display driver circuitry may include a pixel value reordering circuit that reorders first and second streams of pixel values for first and second corresponding rows of a pixel array, respectively. The pixel value reordering circuitry may identify inter-line toggling pixel value pairs and inter-phase toggling pixel value pairs from the first and second streams of pixel values. The display driver circuitry may include compensation calculation circuitry that obtains the identified inter-line toggling pixel value pairs and inter-phase toggling pixel value pairs. The compensation calculation circuitry may generate a compensation value for a pixel value based on the identified inter-line toggling pixel value pairs and inter-phase toggling pixel value pairs.

In one illustrative arrangement, display crosstalk compensation circuitry may include a pixel value reordering circuit that reorders streams of pixel values for corresponding rows of a pixel array and that identifies toggling pixel value pairs from the streams of pixel values. The display crosstalk compensation circuitry may include a subtractor circuit that receives the toggling pixel value pairs and outputs pixel value pair difference values based on the toggling pixel value pairs. The display crosstalk compensation circuitry may include toggling calculation circuitry that receives the pixel value pair difference values and outputs toggling impact values based on the pixel value pair difference values. The display crosstalk compensation circuitry may include interpolation circuitry that receives the toggling impact values and outputs a compensation value for a pixel value.

DETAILED DESCRIPTION

Figure 1:
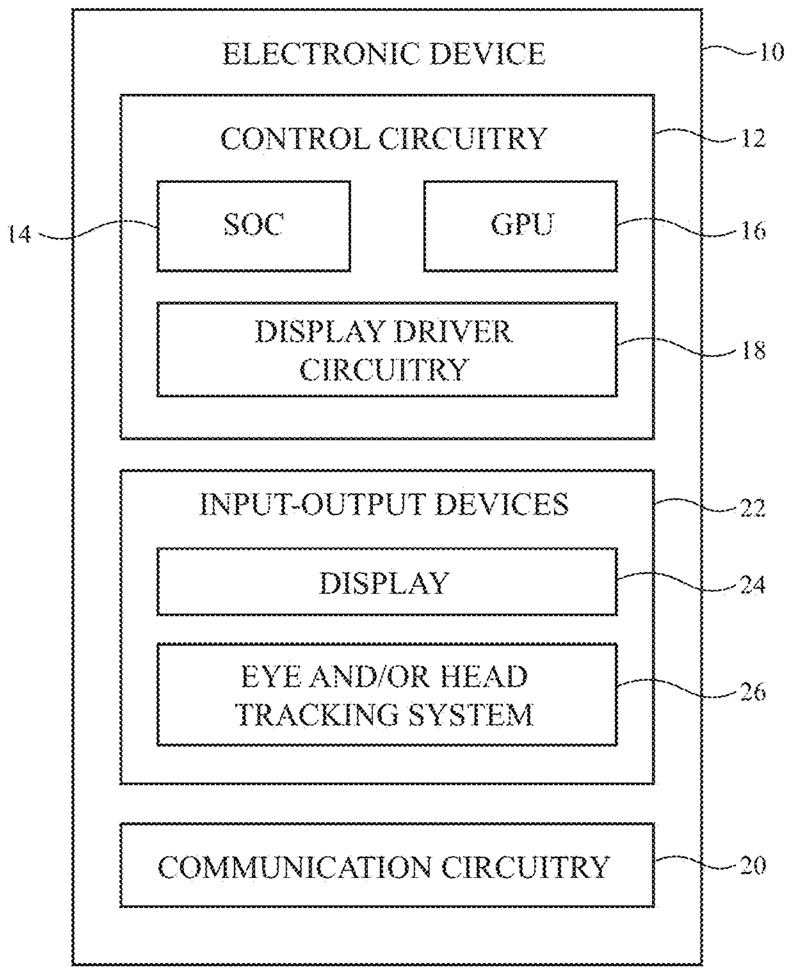
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment.

As shown in FIG. 1, electronic device 10 may have control circuitry 12. Control circuitry 12 may be configured to perform operations in electronic device 10 using hardware (e.g., dedicated hardware or circuitry), firmware and/or software. Software code for performing operations in electronic device 10 and other data is stored on non-transitory computer-readable storage media (e.g., tangible computer-readable storage media) in control circuitry 12. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives and/or solid-state drives), one or more removable flash drives or other removable media, or the like. Memory may also include volatile memory such as random-access memory (e.g., dynamic random-access memory and/or static random-access memory). Software stored on the non-transitory computer readable storage media may be executed on the processing circuitry of control circuitry 12. The processing circuitry may include application-specific integrated circuits with processing circuitry, one or more microprocessors, digital signal processors, graphics processing units, a central processing unit (CPU), or other processing circuitry.

In the example of FIG. 1, control circuitry 12 may include system circuitry 14 (sometimes referred to as system-on-chip (SOC) 14) that integrates one or more microprocessors, multi-core processors, microcontrollers, application-specific integrated circuits, and/or other types of processing circuitry for control circuitry 12. Control circuitry 12 may also include one or more graphics processing units (GPUs) 16 and display driver circuitry 18. Display driver circuitry 18 may include one or more integrated circuits (e.g., display driver integrated circuits) that implement thin-film transistor driving circuits, data programming or loading circuits, timing controller(s), and/or other suitable circuitry for operating display components such as display pixels in a display.

To support communications between device 10 and external equipment, control circuitry 12 may communicate using communication circuitry 20. Communication circuitry 20 may include antennas, radio-frequency transceiver circuitry, radios, and other wireless communication circuitry and/or wired communication circuitry. In some illustrative configurations, portions of communication circuitry 20 (e.g., radios or baseband processors) may be implemented or included as part of the processing circuitry of control circuitry 12.

Communication circuitry 20 may support unidirectional and/or bidirectional wireless communication between device 10 and external equipment over one or more wireless links. As examples, communication circuitry 20 may include wireless communication circuitry that supports communication over wireless personal area network link(s) (e.g., a Bluetooth® link), that supports communication over wireless local area network link(s) (e.g., a WiFi® link), supports communication over a near-field communication link, supports communication over a cellular network link (e.g., a 60 GHz link or other millimeter wave link and/or other cellular network links using other radio-frequency bands), and/or supports communications over any other suitable wired or wireless communications link.

Device 10 may, if desired, include power circuits for transmitting and/or receiving wired and/or wireless power and may include batteries or other energy storage devices. For example, device 10 may include a coil and rectifier circuitry that uses the coil to receive wireless power provided to components (e.g., energy storage devices, control circuitry 12, etc.) in device 10.

Input-output circuitry in device 10 such as input-output devices 22 may be used to receive input (e.g., captured images, user voice or other sound input, user haptic or other force input, etc.) supplied to device 10 and/or to provide output (e.g., visual content such as images and/or videos, sound, haptic output, etc.) from device 10 to the external environment (e.g., to users and/or external equipment). In particular, a user can control the operation of device 10 by supplying commands through input-output devices 22 and may receive status information and other output from device 10 using input-output devices 22. As examples, input-output devices 22 may include buttons, joysticks, scrolling wheels, touch pads, key pads, keyboards, microphones, speakers, tone generators, vibrators, cameras, sensors, light-emitting diodes and other status indicators, data ports, and other electrical components.

Additionally, input-output devices 22 may include one or more displays such as display 24. Display 24 may be a touch screen display that includes a touch sensor for gathering touch input from a user or display 24 may be insensitive to touch. A touch sensor for display 24 may be based on an array of capacitive touch sensor electrodes, acoustic touch sensor structures, resistive touch components, force-based touch sensor structures, a light-based touch sensor, or other suitable touch sensor arrangements.

Some types of electronic device 10 may include two displays 24. In one possible arrangement, a first display 24 may be positioned on one side of device 10 and a second display 24 may be positioned on a second, opposing side of device 10. First and second displays 24 therefore may have a back-to-back arrangement, thereby providing visual content in opposite directions (e.g., to different users). One or both of displays 24 may be curved.

Sensors in input-output devices 22 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 24, a two-dimensional capacitive touch sensor overlapping display 24, and/or a touch sensor that forms a button, trackpad, or other input device not associated with a display), and other sensors. If desired, sensors in input-output devices 22 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors.

Device 10 may include cameras and other components that form part of gaze and/or head tracking system 26. The camera(s) or other components of system 26 may face an expected location for a viewer and may track the viewer's eyes and/or head (e.g., images and other information captured by system 26 may be analyzed by control circuitry 12 to determine the location of the viewer's eyes and/or head). This head-location information obtained by system 26 may be used to determine the appropriate direction with which display content from display 24 should be directed. Eye and/or head tracking system 26 may include any desired number and combination of infrared and/or visible light detectors. Eye and/or head tracking system 26 may optionally include light emitters to illuminate the scene.

Control circuitry 12 may be used to run software on device 10 such as operating system code and applications. During operation of device 10, the software running on control circuitry 12 may display images on display 24 using an array of pixels in display 24.

Display 24 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 24 is an organic light-emitting diode display are sometimes described herein as an example.

Display 24 may have a rectangular shape (i.e., display 24 may have a rectangular footprint and a rectangular peripheral edge that runs around the rectangular footprint) or may have other suitable shapes. Display 24 may be planar or may have a curved profile.

Display 24 may sometimes be a stereoscopic display that is configured to display three-dimensional content for a viewer. Stereoscopic displays are capable of displaying multiple two-dimensional images that are visible from slightly different angles. When viewed together, the combination of the two-dimensional images creates the illusion of a three-dimensional image for the viewer. For example, a viewer's left eye may receive a first two-dimensional image and a viewer's right eye may receive a second (different) two-dimensional image. The viewer perceives these two different two-dimensional images as a single three-dimensional image.

There are numerous ways to implement a stereoscopic display. Display 24 may be a lenticular display that uses lenticular lenses (e.g., elongated lenses that extend along parallel axes), may be a parallax barrier display that uses parallax barriers (e.g., an opaque layer with precisely spaced slits to create a sense of depth through parallax), may be a volumetric display, or may be any other desired type of stereoscopic display. Configurations in which display 24 is a lenticular display are sometimes described herein as an example.

Figure 2:
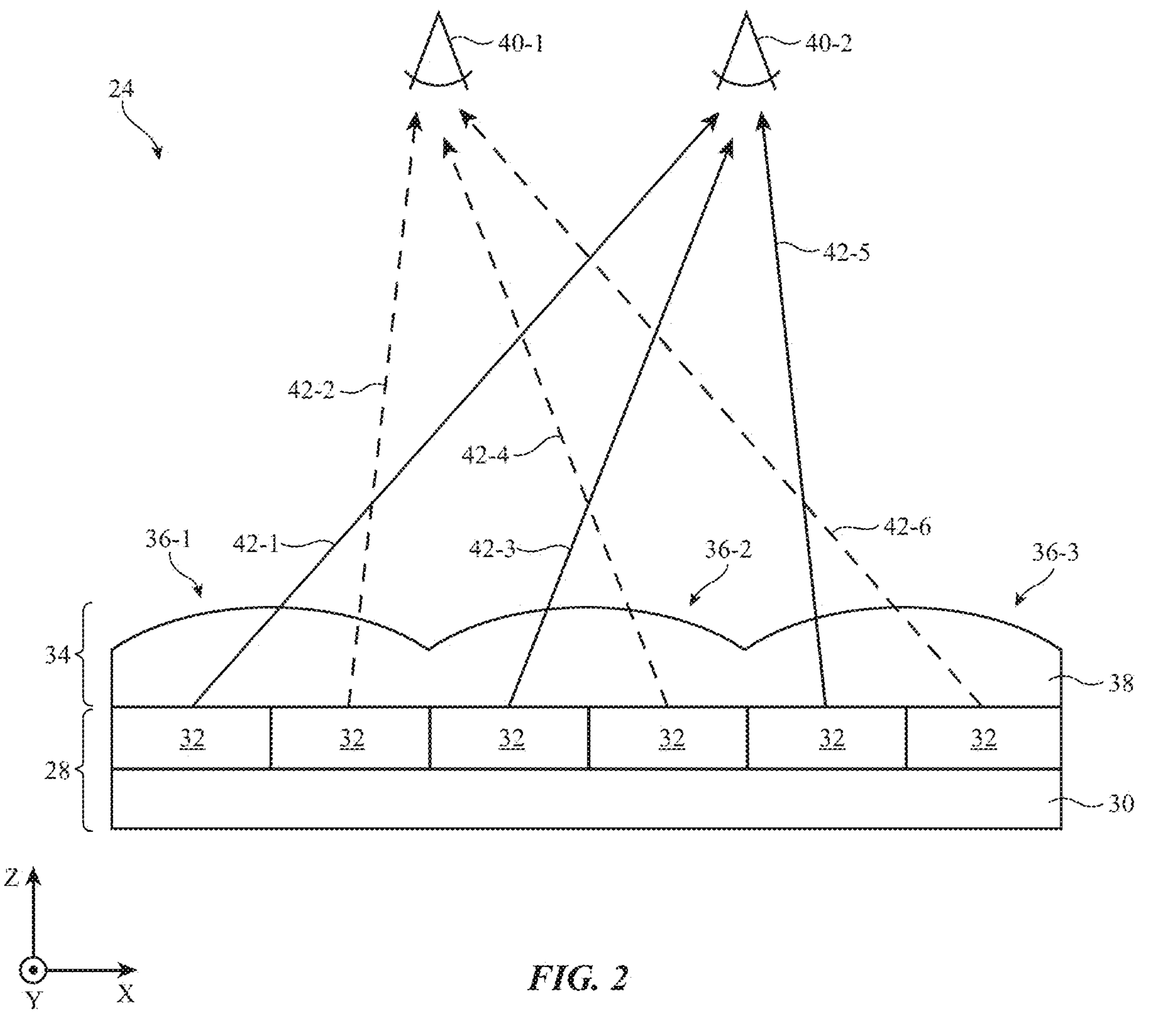
FIG. 2 is a cross-sectional side view of an illustrative display that provides images to a viewer in accordance with some embodiments.

FIG. 2 is a cross-sectional side view of an illustrative lenticular display that may be incorporated into electronic device 10. Display 24 includes a display panel 28 with pixels 32 on substrate 30. Substrate 30 may be formed from glass, metal, plastic, ceramic, and/or other substrate materials and pixels 32 may be organic light-emitting diode pixels, liquid crystal display pixels, or any other desired type of pixels.

As shown in FIG. 2, lenticular lens film 34 may be formed over display pixels 32. Lenticular lens film 34 (sometimes referred to as a light redirecting film, a lens film, etc.) includes lenses 36 and a base film portion 38 (e.g., a planar film portion to which lenses 36 are attached). Lenses 36 may be lenticular lenses that extend along respective longitudinal axes (e.g., axes that extend into the page parallel to the Y-axis). Lenses 36 may be referred to as lenticular elements 36, lenticular lenses 36, optical elements 36, etc.

Figure 3:
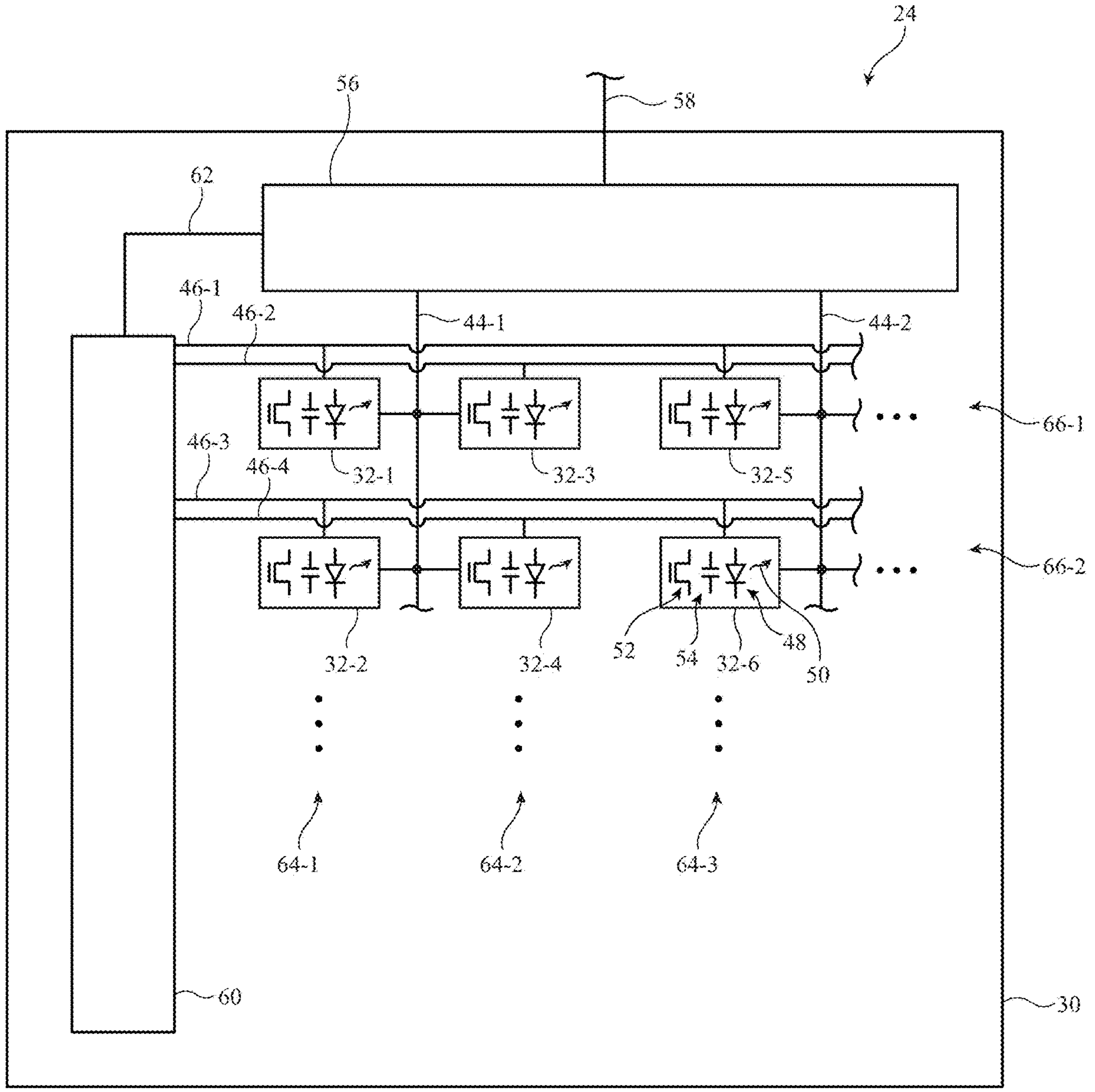
FIG. 3 is a top view of an illustrative display having display driver circuitry in accordance with some embodiments.

Lenses 36 of lenticular lens film 42 cover pixels 32 of display 24. An illustrative configuration is shown in FIG. 3. In this illustrative configuration, two display pixels 32 are covered by a first lenticular lens 36-1, two display pixels 32 are covered by a second lenticular lens 36-2, and two display pixels 32 are covered by a third lenticular lens 36-3. Lenticular lenses 36-1, 36-2, and 36-3 may redirect light from corresponding pairs of covered display pixels 32 to enable stereoscopic viewing of display 24.

Consider the example of display 24 being viewed by a viewer with a first eye 40-1 (e.g., a right eye) and a second eye 40-2 (e.g., a left eye). Light from a first pixel 32 under lens 36-1 is directed by lenticular lens film 34 in direction 42-1 towards eye 40-2, light from a second pixel 32 under lens 36-1 is directed by lenticular lens film 34 in direction 42-2 towards eye 40-1, light from a first pixel 32 under lens 36-2 is directed by lenticular lens film 34 in direction 42-3 towards eye 40-2, light from a second pixel 32 under lens 36-2 is directed by lenticular lens film 34 in direction 42-4 towards eye 40-1, light from a first pixel 32 under lens 36-3 is directed by lenticular lens film 34 in direction 42-5 towards eye 40-2, and light from a second pixel 32 under lens 36-3 is directed by lenticular lens film 34 in direction 42-6 towards eye 40-1. In this way, the viewer's eye 40-1 receives images from second pixels 32 under lenses 36-1, 36-2, and 36-3, whereas the viewer's eye 40-2 receives images from first pixels 32 under lenses 36-1, 36-2, and 36-3. The first pixels 32 may be used to display a slightly different image than the second pixels 32. Consequently, the viewer may perceive the received images as a single three-dimensional image.

Pixels of the same color may be covered by a respective lenticular lens 36. In one example, first and second pixels 32 under lens 36-1 may be red pixels that emit red light, first and second pixels 32 under lens 36-2 may be green pixels that emit green light, and first and second pixels 32 under lens 36-2 may be blue pixels that emit blue light. This example is merely illustrative. In general, each lenticular lens 36 may cover any desired number of pixels each having any desired color. In other words, lenticular lens 36 may cover a plurality of pixels of the same color, may cover a plurality of pixels each of different colors, may cover a plurality of pixels with some pixels of the same color and some pixels of different colors, etc.

Configurations in which display 24 is a lenticular display are described herein as an illustrative example. If desired, display 24 may be another type of stereoscopic display (e.g., that produces three-dimensional images) or may be a two-dimensional display that produces two-dimensional images.

A top view of a portion of display 24 is shown in FIG. 3. As shown in FIG. 3, display 24 may have an array of display pixels 32 formed on substrate 30. Substrate 30 may be formed from glass, metal, plastic, ceramic, and/or other substrate materials. Pixels 32 may receive data signals (e.g., pixel values or pixel voltage values) over signal paths such as data lines 44 and may receive one or more control signals over control signal paths such as control lines 46 (sometimes referred to as gate lines) which can include scan lines, emission control lines, etc. There may be any suitable number of rows and columns of pixels 32 in display 14 (e.g., tens or more, hundreds or more, or thousands or more). Each pixel 32 may have a light-emitting diode 48 that emits light 50 under the control of a pixel circuit formed from thin-film transistor circuitry such as thin-film transistors 52 and thin-film capacitor(s) 54. Thin-film transistors 52 may be polysilicon thin-film transistors, semiconducting-oxide thin-film transistors such as indium gallium zinc oxide transistors, or thin-film transistors formed from other semiconductors. Pixels 32 may contain light-emitting diodes of different colors (e.g., red, green, and blue diodes for red, green, and blue pixels, respectively) to provide display 24 with the ability to display color images. In some contexts, a group of pixels 32 (e.g., of different colors) may be individually referred to as sub-pixels 32 of the group and the group of (sub-)pixels 32 may be collectively referred to as a pixel.

Display driver circuitry may be used to control the operation of pixels 32. The display driver circuitry may be formed from one or more integrated circuits that implement thin-film transistor driving circuits, data programming or loading circuits, timing controller(s), and/or other suitable circuitry. Display driver circuitry 56 of FIG. 2 may contain communications and/or interface circuitry for communicating with system control circuitry such as control circuitry 12 of FIG. 1 over path 58. Path 58 may be formed from traces on a flexible printed circuit or other cable. During operation, the system control circuitry (e.g., control circuitry 12 of FIG. 1) may supply circuitry 56 with information on images to be displayed on display 24. For example, circuitry 56 may receive image data based on which pixel voltage values for displaying the images can be obtained and conveyed to pixels 32.

To display the images on display pixels 32, display driver circuitry 56 may supply pixel voltage values to data lines 44 while issuing clock signals and other control signals for supporting gate driver circuitry such as gate driver circuitry 60 over path 62. If desired, display driver circuitry 56 may also supply clock signals and other control signals to gate driver circuitry on an edge of display 24 opposite the edge of display 24 on which gate driver circuitry 60 shown in FIG. 3 is disposed (e.g., in a double-sided gate driving scheme).

Gate driver circuitry 60 (sometimes referred to as horizontal control line control circuitry) may be implemented as part of an integrated circuit (e.g., forming part of the display driver circuitry) and/or may be implemented using thin-film transistor circuitry. Gate driver circuitry 60 and display driver circuitry 56 may sometimes be collectively referred to as being the display driver circuitry for display 24. Horizontal control lines 46 in display 24 may carry gate line signals such as scan line signals, emission enable control signals, and/or other horizontal control signals for controlling the pixels of each row. There may be any suitable number of horizontal control signals (and corresponding lines carrying these signals) per row of pixels 32 (e.g., one or more, two or more, three or more, four or more, etc.).

In some display configurations, each data line 44 may be shared by (e.g., provide pixel voltage values to) multiple columns of pixels 32. In the example of FIG. 3, data line 44-1 is coupled to pixels in column 64-1 of the pixel array (e.g., pixels 32-1 and 32-2) and pixels in column 64-2 of the pixel array (e.g., pixels 32-3 and 32-4). Similarly, data line 44-2 is coupled to pixels in column 64-3 of the pixel array (e.g., pixels 32-5 and 32-6) and pixels in yet another column of the pixel array.

During a data programming time period (sometimes referred to as a data loading time period), display driver circuitry 56 may supply image data to pixels 32 in different columns sharing a given data line at different times (e.g., in different phases) in conjunction with assertions of corresponding gate signals supplied using different gate lines 46 for the same row. In the example of FIG. 3, gate driver circuitry 60 may supply gate signal(s) on one or more gate lines such as gate line 46-1 that are coupled to and control the state of data loading transistor(s) 52 in a first set of pixels in row 66-1 of the pixel array (e.g., pixels in odd-numbered columns 64 and in row 66-1) and may supply gate signal(s) on one or more gate lines such as gate line 46-2 that are coupled to and control the state of data loading transistor(s) 52 in a second set of pixels in row 66-1 (e.g., pixels in even-numbered columns 64 and in row 66-1). Similarly, gate driver circuitry 60 may supply gate signal(s) on one or more gate lines such as gate line 46-3 that are coupled to and control the state of data loading transistor(s) 52 in a first set of pixels in row 66-2 of the pixel array (e.g., pixels in odd-numbered columns 64 and in row 66-2) and may supply gate signal(s) on one or more gate lines such as gate line 46-4 that are coupled to and control the state of data loading transistor(s) 52 in a second set of pixels in row 66-2 (e.g., pixels in even-numbered columns 64 and in row 66-2).

Figure 4:
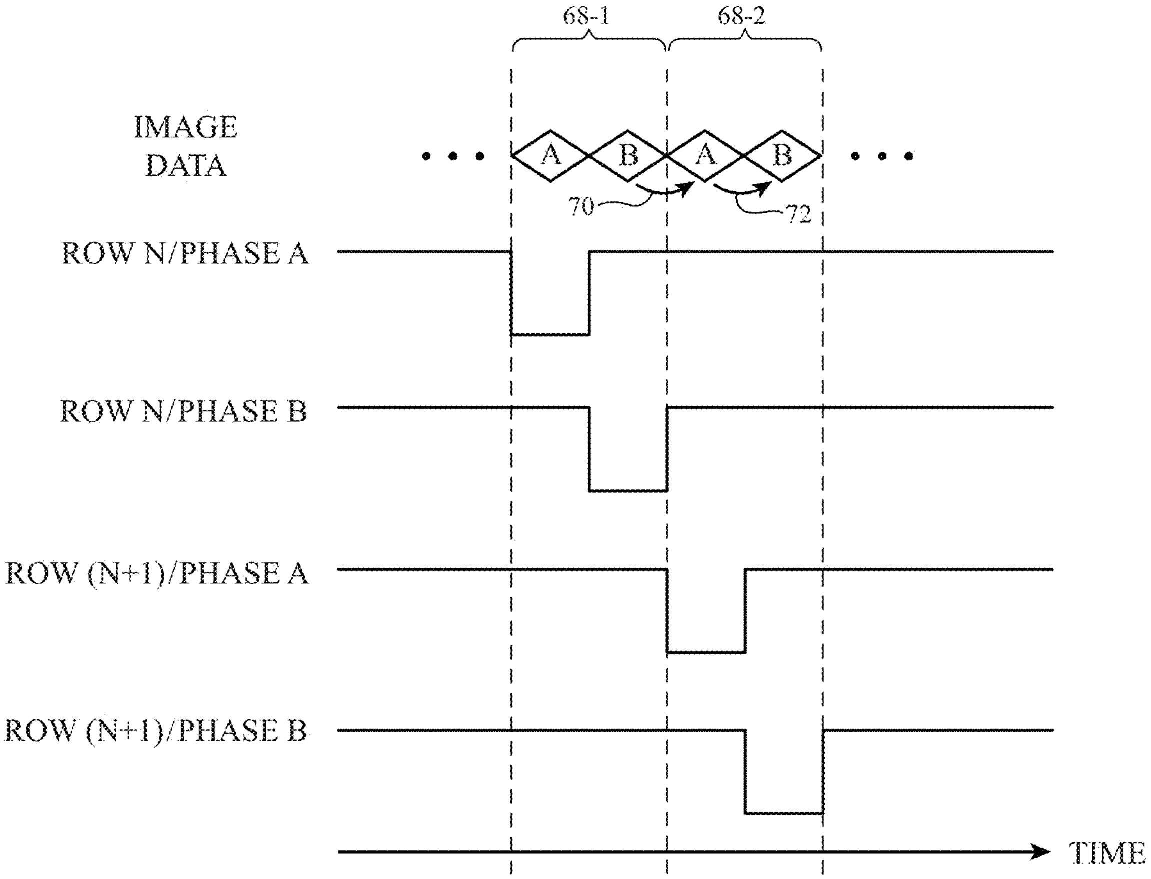
FIG. 4 is an illustrative timing diagram for pixel value programming into display pixels in accordance with some embodiments.

FIG. 4 is an illustrative timing diagram for loading image data (e.g., pixel voltage values) into a portion of pixels in the pixel array, which is implemented with a shared data line display configuration such as the configuration described in connection with FIG. 3. Two illustrative line time periods 68-1 and 68-2 are shown in the example of FIG. 4 for loading pixel voltage values into pixels in two corresponding rows N and N+1. As one illustrative example, row N may be row 66-1 of FIG. 3 and row N+1 may be row 66-2 of FIG. 3.

A single data line (e.g., line 44-1 of FIG. 3) may provide the image data (e.g., pixel values to be conveyed to corresponding pixels) as depicted in FIG. 4. In a first portion (e.g., in phase A) of time period 68-1, a first gate line (e.g., gate line 46-1 of FIG. 3) may activate a corresponding transistor (e.g., transistor 52 in pixel 32-1 of FIG. 3) to load a pixel voltage value (for the image to be subsequently displayed) onto a pixel capacitor (e.g., capacitor 54 in pixel 32-1 of FIG. 3) based on a pixel voltage value on the data line during this phase of the time period. In a second portion (e.g., in phase B) of time period 68-1, a second gate line (e.g., gate line 46-2 of FIG. 3) may activate a corresponding transistor (e.g., transistor 52 in pixel 32-3 of FIG. 3) to load a pixel voltage value (for the image to be subsequently displayed) onto a pixel capacitor (e.g., capacitor 54 in pixel 32-3 of FIG. 3) based on a pixel voltage value on the data line during this phase of the time period.

In a first portion (e.g., in phase A) of time period 68-2, a third gate line (e.g., gate line 46-3 of FIG. 3) may activate a corresponding transistor (e.g., transistor 52 in pixel 32-2 of FIG. 3) to load a pixel voltage value (for the image to be subsequently displayed) onto a pixel capacitor (e.g., capacitor 54 in pixel 32-2 of FIG. 3) based on a pixel voltage value on the data line during this phase of the time period. In a second portion (e.g., in phase B) of time period 68-2, a fourth gate line (e.g., gate line 46-4 of FIG. 3) may activate a corresponding transistor (e.g., transistor 52 in pixel 32-4 of FIG. 3) to load an a pixel voltage value (for the image to be subsequently displayed) onto a pixel capacitor (e.g., capacitor 54 in pixel 32-4 of FIG. 3) based on a pixel voltage value on the data line during this phase of the time period.

The loading of image data from a single data line onto pixel in a portion of the pixel array is illustrated in FIG. 4. Image data (e.g., pixel voltage values) from other shared data lines may be loaded in a similar manner. In general, a first set of gate lines may each convey a control signal that facilitates pixel value loading into a first set of pixels during a first phase of the line time period for its respective pixel row and a second (different) set of gate lines may each convey a control signal that facilitates pixel value loading into a second (different) set of pixels during a second phase of the line time period for its respective pixel row. If desired, displays such display 24 may be configured with data lines that are each shared by pixels of more than two columns (e.g., by pixels in three columns, four columns, etc.) and may operate with a corresponding number of phases (e.g., three phases, four phases, etc.) for each line time period.

While displays that have shared data line schemes may exhibit desirable properties such as higher pixel density, larger aperture ratio, lower manufacturing costs, etc., these displays, without more, may also undesirably experience crosstalk between pixels during pixel value loading. In particular, this crosstalk may occur due to simultaneous switching of pixel values on the shared data lines adversely impacting power supply (e.g., a large simultaneous change in current draw from a power supply rail providing a power supply voltage), which in turn impacts the pixel values being loaded into the corresponding pixels. For shared data line schemes, the switching (e.g., transition, toggling) of pixel values may occur between the loading of pixel values into pixels in different pixel rows, which is sometimes referred to as inter-line toggling, and may occur between loading of pixel values into pixels in the same row but for different programming phases, which is sometimes referred to as inter-phase toggling.

In the example of FIG. 4, the transition of the image data carried by the shared data line (e.g., data line 44-1) from the pixel value for row N and phase B (in line time period 68-1) to the pixel value for row (N+1) and phase A (in line time period 68-2) is an inter-line toggling of pixel values. The transition of the image data carried by the shared data line (e.g., data line 44-1) from the pixel value for row (N+1) and phase A (in line time period 68-2) to the pixel value for row (N+1) and phase B (in line time period 68-2) is an inter-phase toggling of pixel values.

While displays having column-specific (non-shared) data lines can exhibit crosstalk due to a more straightforward pattern of inter-line toggling and therefore perform corresponding crosstalk compensation, the crosstalk compensation performed by these displays may not be applicable to (e.g., may not accurately compensate for) the inter-line and inter-phase toggling crosstalk exhibited by displays that have shared data line. In particular, the specific pattern of inter-line and inter-phase toggling should be accounted for to properly compensate for the crosstalk exhibited by displays that have shared data lines.

Figure 5:
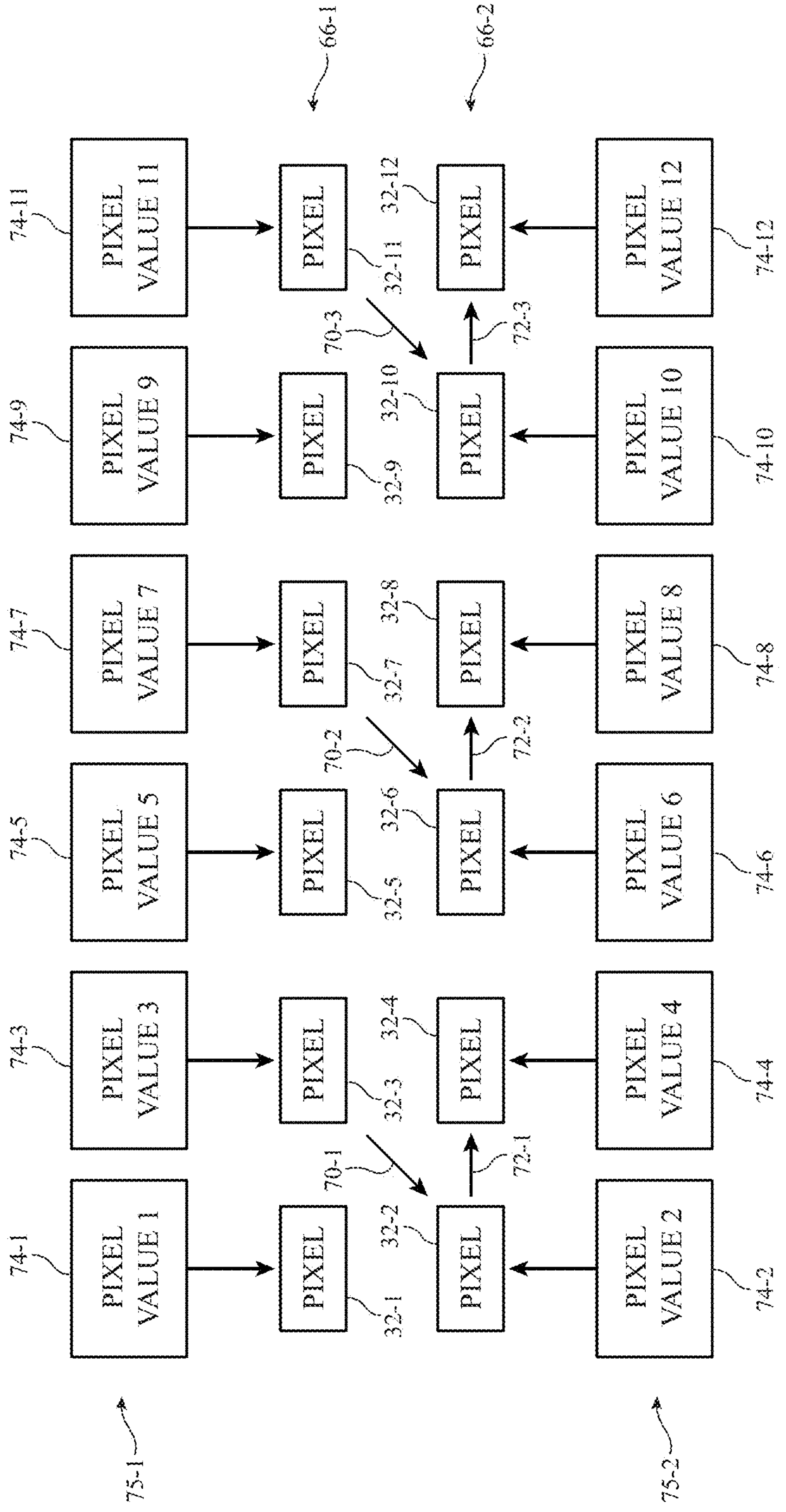
FIG. 5 is a diagram of illustrative inter-line toggling and inter-phase toggling in accordance with some embodiments.

FIG. 5 is a diagram of illustrative set of pixels across two pixel rows such as rows 66-1 and 66-2 and illustrative pixel values provided by the display driver circuitry for loading into the set of pixel using shared pixel data lines. The pixel values shown in FIG. 5 may be image data for a single image frame and may be loaded into the set of pixels using two line time periods, each having two programming phases (e.g., as similarly described in connection with FIG. 4).

The display driver circuitry may obtain, process, and output pixel values in a row-wise manner. Accordingly, in the example of FIG. 5, pixel values 74-1, 74-3, 74-5, 74-7, 74-9, and 74-11 may be organized as a first set of pixel values 75-1 (e.g., a first stream of pixel values) obtained, processed, and output for pixel row 66-1, whereas pixel values 74-2, 74-4, 74-6, 74-8, 74-10, and 74-12 may be organized as a second set of pixel values 75-2 (e.g., a second stream of pixel values following the first stream of pixel values) obtained, processed, and output for pixel row 66-2.

In particular, pixels 32-1, 32-2, 32-3, and 32-4 may be coupled to and share a single pixel data line that provide pixel values 74-1, 74-2, 74-3, and 74-4 to pixels 32-1, 32-2, 32-3, and 32-4, respectively, during corresponding phases in corresponding line time periods (e.g., during phase A or B of line time period for row 66-1 or 66-2). Pixels 32-5, 32-6, 32-7, and 32-8 may be coupled to and share a single pixel data line that provide pixel values 74-5, 74-6, 74-7, and 74-8 to pixels 32-5, 32-6, 32-7, and 32-8, respectively, during the corresponding phases in the corresponding line time periods (e.g., during phase A or B of line time period for row 66-1 or 66-2). Pixels 32-9, 32-10, 32-11, and 32-12 may be coupled to and share a single pixel data line that provide pixel values 74-9, 74-10, 74-11, and 74-12 to pixels 32-9, 32-10, 32-11, and 32-12, respectively, during the corresponding phases in the corresponding line time periods (e.g., during phase A or B of line time period for row 66-1 or 66-2).

In the example of FIG. 5, inter-line toggling 70-1 between pixel values 74-3 and 74-2 during the transition of line time periods (between the loading of pixel values into pixels 32-3 and 32-2), inter-phase toggling 72-1 between pixel values 74-2 and 74-4 during the transition of programming phases in the same line time period (between the loading of pixel values into pixels 32-2 and 32-4), inter-line toggling 70-2 between pixel values 74-7 and 74-6 during the transition of line time periods (between the loading of pixel values into pixels 32-7 and 32-6), inter-phase toggling 72-2 between pixel values 74-6 and 74-8 during the transition of programming phases in the same line time period (between the loading of pixel values into pixels 32-6 and 32-8), inter-line toggling 70-3 between pixel values 74-11 and 74-10 during the transition of line time periods (between the loading of pixel values into pixels 32-11 and 32-10), inter-phase toggling 72-3 between pixel values 74-10 and 74-12 during the transition of programming phases in the same line time period (between the loading of pixel values into pixels 32-10 and 32-12) may cause crosstalk to neighboring pixels (and to each other) due to the impact of the coordinated toggling of pixel values on the power supply.

In some illustrative configurations described herein as an example, crosstalk compensation as described herein may be performed for pixel values to be loaded into pixels of row 66-2. In general, crosstalk compensation as described herein may be similarly performed for pixel values to be loaded into pixels of any suitable pixel row.

Figure 6:
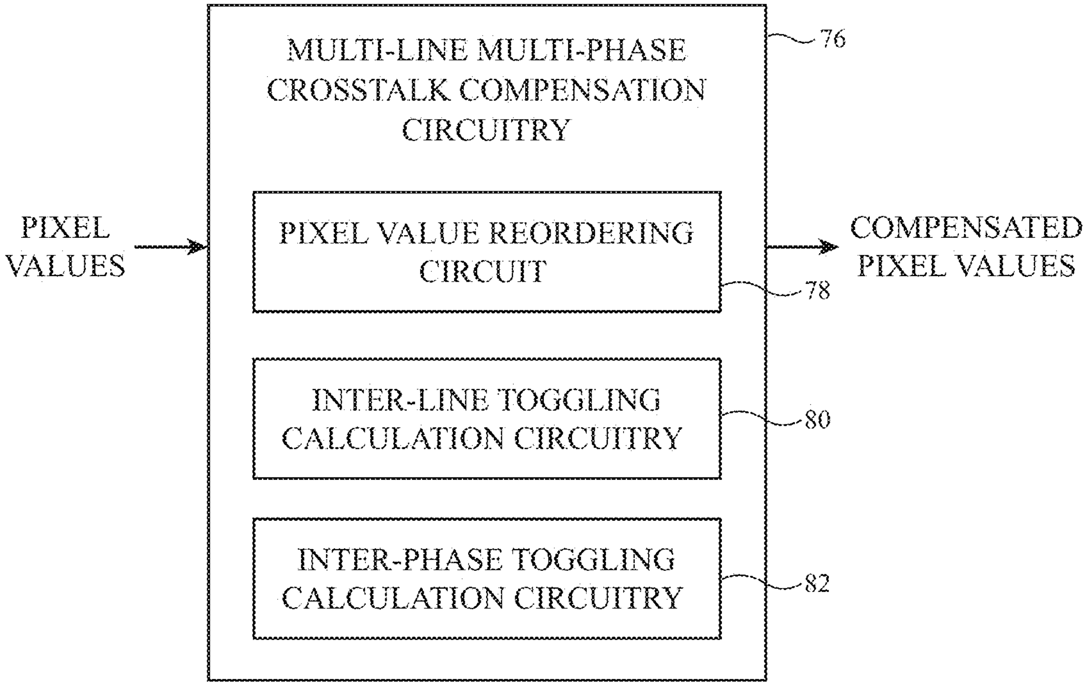
FIG. 6 is a schematic diagram of illustrative multi-line multi-phase crosstalk compensation circuitry in accordance with some embodiments.

FIG. 6 is a diagram of illustrative crosstalk compensation circuitry such as crosstalk compensation circuitry 76 configured to compensate for crosstalk caused by inter-line toggling and inter-phase toggling on shared data lines. In other words, crosstalk compensation circuitry 76 may receive pixel (voltage) values and output compensated pixel (voltage) values based on compensating for inter-line toggling and inter-phase toggling on shared data lines. Accordingly, crosstalk compensation circuitry 76 may sometimes be referred to as multi-line (or inter-line) multi-phase (or inter-phase) crosstalk compensation circuitry.

Compensation circuitry 76 may be implemented as part of display driver circuitry 56 of FIG. 3 and/or elsewhere in the display pipeline that handle the processing of pixel values prior to being conveyed to the display pixels. Compensation circuitry 76 may obtain the input pixel values prior to being processed by some portions of display driver circuitry 56 and/or after being processed by other portions of display driver circuitry 56.

Crosstalk compensation circuitry 76 may include pixel value reordering circuit 78, inter-line toggling calculation circuitry 80, and inter-phase toggling calculation circuitry 82. Pixel value reordering circuit 78 may reorder pixel values from multiple pixel rows to identify inter-line toggling of pixel values and inter-phase toggling of pixel values more easily. Inter-line toggling calculation circuitry 80 may use the identified inter-line toggling to determine inter-line toggling impact on victim pixels affected by inter-line toggling crosstalk. Inter-phase toggling calculation circuitry 82 may use the identified inter-phase toggling to determine inter-phase toggling impact on victim pixels affected by inter-phase toggling crosstalk (and affected by inter-line toggling crosstalk). These types of impacts (e.g., characterized by impact values generated by circuitry 80 and 82) may further be used to determine a compensation value that is applied (e.g., added) to an input pixel value to obtain a compensated pixel value for output. The compensated pixel values may be programmed into corresponding pixels of display 24 (e.g., with or without additional downstream processing of the compensated pixel values) during respective phases on shared data lines and using corresponding gate lines (e.g., as described in connection with FIGS. 3 and 4).

Inter-line toggling calculation circuitry 80 and inter-phase toggling calculation circuitry 82 may operate independently to characterize the respective impacts of their corresponding types of crosstalk. Circuitry 80 and 82 may have separate components and/or shared components.

Figure 7:
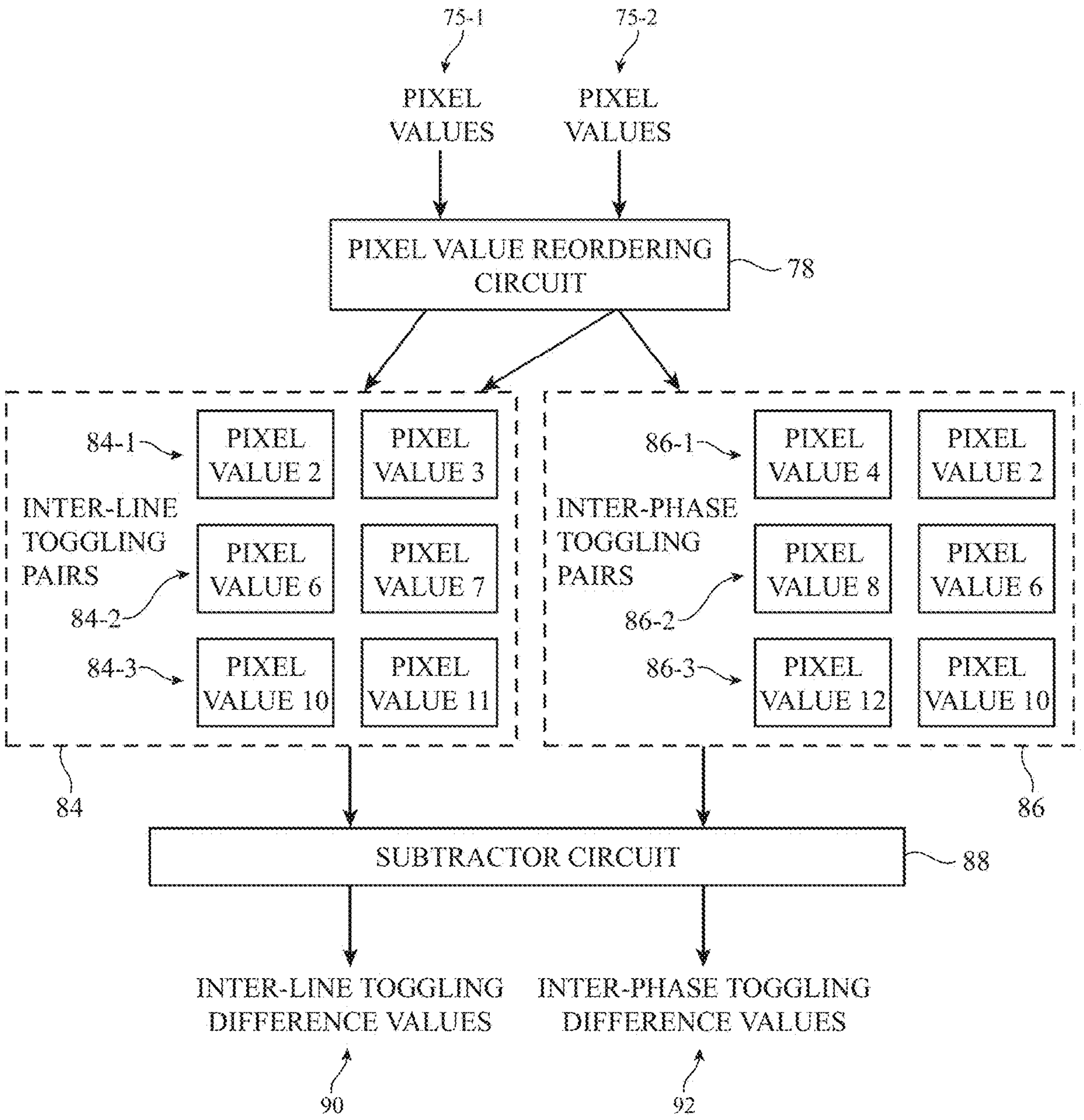
FIG. 7 is a flowchart of an illustrative pixel value reordering circuit in accordance with some embodiments.

FIG. 7 is a diagram of an illustrative pixel value reordering circuit such as reordering circuit 78 in crosstalk compensation circuitry. FIG. 7 also shows other illustrative portions of the crosstalk compensation circuitry (e.g., crosstalk compensation circuitry 76 of FIG. 6) that generate inter-line toggling difference values and inter-phase toggling different values from the output of reordering circuit 78 (e.g., the reordered pairs of pixel values).

In the example of FIG. 7, reordering circuit 78 may receive a first set of pixel values for a first pixel row (e.g., pixel values 75-1 for pixel row 66-1 of FIG. 5) and a second set of pixel values for a second pixel row (e.g., pixel values 75-2 for pixel row 66-2 of FIG. 5). Reordering circuit 78 may reorder the received pixel values, e.g., to obtain inter-line toggling pixel value pairs 84 from pixel values 75-1 and 75-2 and to obtain inter-phase toggling pixel value pairs 86 from pixel values 75-2. Reordering circuit 78 may perform the reordering operation using a pre-configured or pre-determined reordering scheme based on the display configuration (e.g., based on the toggling pattern specific to the display pixel layout and data line sharing scheme). If desired, reordering circuit 78 may be implemented using one or more state machines.

As examples, a first inter-line toggling pixel value pair 84-1 may include pixel value 74-2 from pixel values 75-2 and pixel value 74-3 from pixel values 75-1 and may identify or be indicative of inter-line toggling of 70-1 of FIG. 5, a second inter-line toggling pixel value pair 84-2 may include pixel value 74-6 from pixel values 75-2 and pixel value 74-7 from pixel values 75-1 and may identify or be indicative of inter-line toggling of 70-2 of FIG. 5, and a third inter-line toggling pixel value pair 84-3 may include pixel value 74-10 from pixel values 75-2 and pixel value 74-11 from pixel values 75-1 and may identify or be indicative of inter-line toggling of 70-3 of FIG. 5.

As examples, a first inter-phase toggling pixel value pair 86-1 may include pixel value 74-4 and pixel value 74-2 from pixel values 75-2 and may identify or be indicative of inter-phase toggling of 72-1 of FIG. 5, a second inter-phase toggling pixel value pair 86-2 may include pixel value 74-8 and pixel value 74-6 from pixel values 75-2 and may identify or be indicative of inter-phase toggling of 72-2 of FIG. 5, and a third inter-phase toggling pixel value pair 86-3 may include pixel value 74-12 and pixel value 74-10 from pixel values 75-2 and may identify or be indicative of inter-phase toggling of 72-3 of FIG. 5.

These examples of inter-line toggling pixel value pairs 84 and/or inter-line toggling pixel value pairs 84 are merely illustrative. If desired, other inter-line and/or inter-phase toggling pixel value pairs may be identified for pixel row 66-2. In general, reordering circuit 78 may receive pixel values from any suitable sets of pixel values and reorder the pixel values to obtain inter-line toggling pixel value pairs 84 and/or inter-line toggling pixel value pairs 86 across the entire pixel array.

Pixel value pairs obtained by reordering circuit 78 may be provided to subtractor circuit 88 (e.g., forming part of crosstalk compensation circuitry 76 such as circuitry 80 and/or circuitry 82). Subtractor circuit 88 may obtain the difference between each pixel value pair (e.g., by subtracting a first pixel value in the pair from the second pixel value in the pair).

Accordingly, subtractor circuit 88 may generate inter-line toggling pixel value pair difference values 90 by obtaining the difference between each pair of pixel values in the inter-line toggling pairs. In other words, inter-line toggling difference values 90 may include a value that is the difference between pixel values 74-3 and 74-2 (e.g., pixel value 74-3 subtracted from pixel value 74-2), a value that is the difference between pixel values 74-7 and 74-6 (e.g., pixel value 74-7 subtracted from pixel value 74-6), a value that is the difference between pixel values 74-11 and 74-10 (e.g., pixel value 74-11 subtracted from pixel value 74-10), etc.

Subtractor circuit 88 may further generate inter-phase toggling pixel value pair difference values 92 by obtaining the difference between each pair of pixel values in the inter-phase toggling pairs. In other words, inter-phase toggling difference values 92 may include a value that is the difference between pixel values 74-2 and 74-4 (e.g., pixel value 74-2 subtracted from pixel value 74-4), a value that is the difference between pixel values 74-6 and 74-8 (e.g., pixel value 74-6 subtracted from pixel value 74-8), a value that is the difference between pixel values 74-10 and 74-12 (e.g., pixel value 74-10 subtracted from pixel value 74-12), etc.

Figure 8:
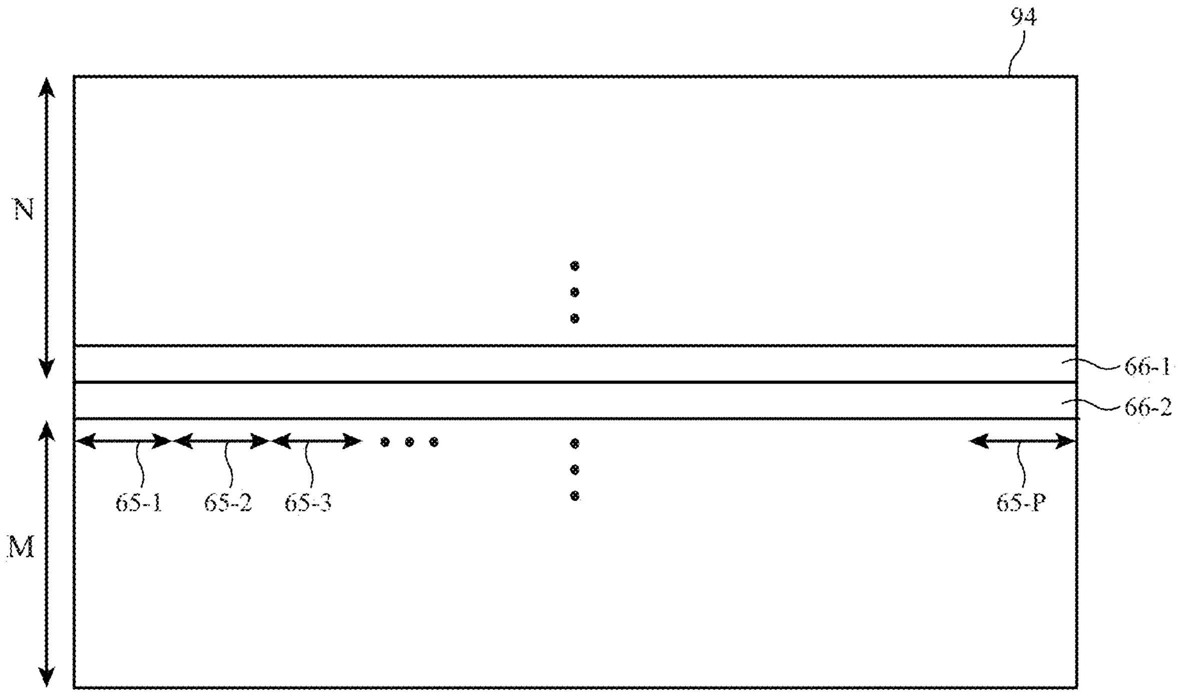
FIG. 8 is a diagram of an illustrative neighboring pixel array portion impacting pixel value loading for pixels in a pixel row in accordance with some embodiments.

A given pixel (e.g., the programming of pixel value at the given pixel) may be impacted by crosstalk caused by inter-line toggling and inter-phase toggling of nearby pixels (e.g., other pixels in the same row and other pixels in neighboring rows). FIG. 8 is a diagram of an illustrative portion of the pixel array for which inter-line toggling and inter-phase toggling information is used by crosstalk compensation circuitry (e.g., circuitry 80 and 82) to compensate for crosstalk experienced by some pixels (e.g., pixels in row 66-2.

As shown in FIG. 8, row 66-2 may include any suitable number of pixels (e.g., arranged in corresponding columns). When computing crosstalk impact for pixels in row 66-2, the crosstalk compensation circuitry may divide row 66-2 into P number of segments or groups 65, where P is any suitable number between one and the total number of pixels in row 66-2 (e.g., four, eight, ten, etc.). Inter-line toggling difference values 90 may be generated for pixel values of each applicable pixel in row 66-2 (e.g., pixel values for pixels 32-2, 32-6, 32-10, etc., with respect to pixel values for the corresponding pixels in row 66-1 such as pixels 32-3, 32-7, 32-11, etc., as described in FIGS. 5 and 7). Similarly, inter-phase toggling difference values 92 may be generated for pixels of each applicable pixel in row 66-2 (e.g., pixel values for pixels 74-4, 74-8, 74-12, etc., with respect to pixel values for pixels 74-2, 74-6, 74-10, etc. as described in FIGS. 5 and 7).

Inter-line toggling calculation circuitry 80 may generate an average inter-line toggling difference value for each group 65 by averaging the inter-line difference value(s) across that group 65. Accordingly, inter-line toggling calculation circuitry 80 may generate P number of average inter-line toggling difference values. Inter-line toggling calculation circuitry 80 may similarly obtain average inter-line toggling difference values for groups in each of the N number of preceding pixel rows (e.g. including row 66-1) based on inter-line toggling that occurs with respect to the line time periods of those preceding pixel rows. Inter-line toggling calculation circuitry 80 may similarly obtain average inter-line toggling difference values for groups in each of the M number of succeeding pixel rows based on inter-line toggling that occurs with respect to the line time periods of those succeeding pixel rows.

Analogously, inter-phase toggling calculation circuitry 82 may generate an average inter-phase toggling difference value for each group 65 by averaging the inter-phase difference value(s) across that group 65. Accordingly, inter-phase toggling calculation circuitry 82 may generate P number of average inter-phase toggling difference values. Inter-phase toggling calculation circuitry 82 may similarly obtain average inter-phase toggling difference values for groups in each of the N number of preceding pixel rows (e.g. including row 66-1) based on inter-phase toggling that occurs with respect to the line time periods of those preceding pixel rows. Inter-phase toggling calculation circuitry 82 may similarly obtain average inter-phase toggling difference values for groups in each of the M number of succeeding pixel rows based on inter-phase toggling that occurs with respect to the line time periods of those succeeding pixel rows.

In the example of FIG. 8, crosstalk compensation circuitry 76 may consider the impact of inter-line toggling of pixels values characterized by average inter-line toggling difference values obtained for pixel portion 94 (e.g., for different groups in row 66-2, in the N preceding rows, and in the M succeeding rows) and the impact of inter-phase toggling of pixels values characterized by average inter-phase toggling difference values obtained for pixel portion 94 (e.g., for different groups in row 66-2, in the N preceding rows, and in the M succeeding rows) when performing multi-line and multi-phase crosstalk compensation for each pixel in row 66-2. In other words, crosstalk compensation circuitry 76 may generate a compensation value for each pixel value for pixels in row 66-2 at least partly based on average inter-line toggling difference values for pixel array portion 94 and based on average inter-phase toggling difference values for pixel array portion 94. Values for N and M may be the same or different and may each generally be any suitable value (e.g., one, two, three, four, five, six, etc.).

Crosstalk compensation for other pixel rows may be perform in a similar manner (e.g., using groups in that pixel row, groups in pixel row(s) preceding that pixel row, groups in pixel row(s) succeeding that pixel row).

Figure 9:
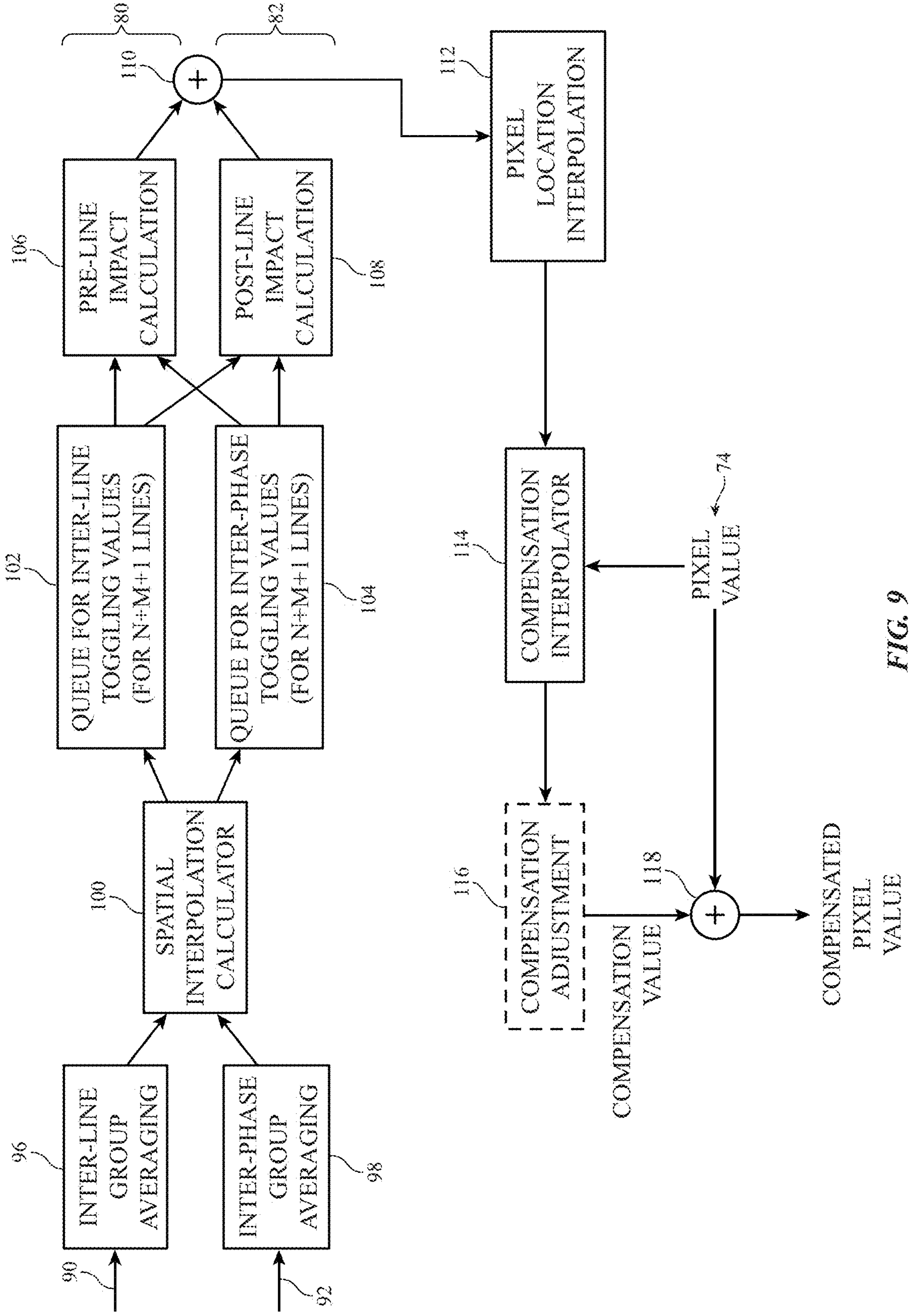
FIG. 9 is a diagram of illustrative inter-line toggling and inter-phase toggling calculation circuitry in accordance with some embodiments.

An illustrative implementation of inter-line toggling calculation circuitry 80 and inter-phase toggling calculation circuitry 82, and other portions of crosstalk compensation circuitry 76, (sometimes collectively referred to as compensation calculation circuitry) is shown in FIG. 9. In the example of FIG. 9, inter-line toggling calculation circuitry 80 may include an inter-line group averaging circuit 96 that receives inter-line toggling pixel value difference values 90, e.g., output from subtractor circuit 88 in FIG. 7 coupled to circuit 96. Inter-line group averaging circuit 96 may output average inter-line toggling pixel difference values that average inter-line toggling pixel value difference values 90 within each group of each row (e.g., as described in FIG. 8 for groups 65 in row 66-2 and groups in proceeding and succeeding rows). Accordingly, these average inter-line toggling pixel difference values may be referred to as group average (inter-line toggling difference) values.

Averaging circuit 96 may be coupled to and output the group average inter-line toggling difference values for each row to spatial interpolation calculator 100. Group average inter-line toggling difference values may be indicative of how (e.g., a degree or amount) the inter-line toggling of each group impacts or affects neighboring pixels or pixel groups (e.g., a degree or amount with which the inter-line toggling of each group acts in the aggressor capacity). Spatial interpolation calculator 100 may transform or convert the group average inter-line toggling difference values to corresponding group inter-line toggling impact values (e.g., each indicative of a degree or amount that pixel group is impacted or victimized by the inter-line toggling of pixel groups in the same row). Spatial interpolation calculator 100 may perform a cross-correlation between the different group average inter-line toggling difference values for the pixel row (and based on the relative positions of the groups) to characterize (e.g., determine) the inter-line toggling impact on each group and obtain an inter-line toggling impact value for each group (e.g., each of groups 65 in FIG. 8). Spatial interpolation calculator 100 may sometimes be referred to as a spatial interpolation calculation circuit, a cross-correlation circuit, a transformation circuit, or a conversion circuit.

Inter-line toggling calculation circuitry 80 may include a queue 102 (e.g., a first-in first-out (FIFO) storage circuit) coupled to and configured to receive inter-line toggling (impact) values from circuit 100. In particular, queue 102 (or generally a storage circuit) may store (e.g., hold) inter-line toggling impact values for groups in a given row (e.g., row 66-2), in N preceding rows, and in M succeeding rows (e.g., an inter-line toggling impact value for each of these groups).

In the example of FIG. 9, inter-phase toggling calculation circuitry 82 may include an inter-phase group averaging circuit 98 that receives inter-phase toggling pixel value difference values 92, e.g., output from subtractor circuit 88 in FIG. 7 coupled to circuit 98. Inter-phase group averaging circuit 98 may output average inter-phase toggling pixel difference values that average inter-phase toggling pixel value difference values 92 within each group of each row (e.g., as described in FIG. 8 for groups 65 in row 66-2 and groups in proceeding and succeeding rows). Accordingly, these average inter-phase toggling pixel difference values may be referred to as group average (inter-phase toggling difference) values.

Averaging circuit 98 may be coupled to and output the group average inter-phase toggling difference values for each row to circuit 100. Group average inter-phase toggling difference values may be indicative of how (e.g., a degree or amount) the inter-phase toggling of each group impacts or affects neighboring pixels or pixel groups (e.g., a degree or amount the inter-phase toggling of each group acts in the aggressor capacity). Circuit 100 may transform or convert the group average inter-phase toggling difference values to corresponding group inter-phase toggling impact values (e.g., each indicative of a degree or amount that pixel group is impacted or victimized by the inter-phase toggling of pixel groups in the same row). Circuit 100 may perform a cross-correlation between the different group average inter-phase toggling difference values for the pixel row (and based on the relative positions of the groups) to characterize (e.g., determine) the inter-phase toggling impact on each group and obtain an inter-phase toggling impact value for each group (e.g., each of groups 65 in FIG. 8).

Inter-phase toggling calculation circuitry 82 may include a queue 104 (e.g., a first-in first-out (FIFO) storage circuit) coupled to and configured to receive inter-phase toggling (impact) values from circuit 100. In particular, queue 104 (or generally a storage circuit) may store (e.g., hold) inter-phase toggling impact values for groups in a given row (e.g., row 66-2), in N preceding rows, and in M succeeding rows (e.g., an inter-phase toggling impact value for each of these groups).

In the illustrative example of FIG. 9, circuitry 80 and circuitry 82 may have separate group average circuits and storage circuits (e.g., queues) and may share circuit 100. If desired, separate circuits 100 may be provided for circuitry 80 and circuitry 82 and/or other circuits may be shared between circuitry 80 and circuitry 82.

Queues 102 and 104 may each be coupled to a pre-line impact calculation circuit 106 and a post-line impact calculation circuit 108. In particular, pre-line impact calculation circuit 106 may receive inter-line toggling impact values for preceding lines (e.g., N preceding rows) from queue 102 and may receive inter-phase toggling impact values for preceding lines (e.g., N preceding rows) from queue 104. Pre-line impact calculation circuit 106 may determine (e.g., calculate) the impact of the toggling of pixel values in these preceding lines on the impact values of the given row being compensated (e.g., row 66-2). As an example, pre-line impact calculation circuit 106 may include a combination of selection, multiply, and summation circuits to calculate impact values for the given row based on the inter-line toggling impact values and inter-phase toggling impact values for the preceding lines.

Post-line impact calculation circuit 108 may receive inter-line toggling impact values for succeeding lines (e.g., M succeeding rows) from queue 102 and may receive inter-phase toggling impact values for succeeding lines (e.g., M succeeding rows) from queue 104. Post-line impact calculation circuit 108 may determine (e.g., calculate) the impact of the toggling of pixel values in these succeeding lines on the impact values of the given row being compensated (e.g., row 66-2). As an example, post-line impact calculation circuit 108 may include a combination of selection, multiply, and summation circuits to calculate impact values for the given row based on the inter-line toggling impact values and inter-phase toggling impact values for the succeeding lines.

As appropriate, the inter-line toggling impact values and the inter-phase toggling impact values may be scaled or otherwise processed by circuits 106 and 108 and/or prior to being received by circuits 106 and 108.

The toggling impact values for the given row (e.g., row 66-2) caused by toggling of pixel values in preceding lines output by circuit 106 and the impact values for the given row (e.g., row 66-2) caused by toggling of pixel values in succeeding lines output by circuit 108 (and any other impact values such as the impact values for the given row (e.g., row 66-2) caused by toggling of pixel values in row 66-2 itself) may be combined at a summation circuit 110 coupled to circuits 106 and 108. Accordingly, summation circuit 110 may provide a combined toggling impact value for each group of the given pixel row (e.g., row 66-2) being compensated. The combined toggling impact values are indicative of a degree or amount of impact to the group caused by inter-line toggling and inter-phase toggling associated each group in portion 94 of FIG. 8.

Summation circuit 110 may be coupled to and provide the per-group combined toggling impact values to pixel location interpolator 112 (e.g., an impact value interpolation circuit). Because the combined toggling impact values are provided on a per-pixel-group basis and pixel value compensation is performed on a per-pixel basis, location interpolator 112 may interpolate a pixel-specific (per-pixel) impact value for a given pixel value based on the location of the pixel (to be loaded with the pixel value) in the row being compensated and based on the per-group combined toggling impact values for the row. Location interpolator 112 may be implemented using any suitable type of interpolation circuit (e.g., a linear interpolation circuit, a polynomial interpolation circuit, etc.)

Location interpolator 112 may be coupled to and provide the per-pixel impact value to compensation interpolator 114 (e.g., a compensation value interpolation circuit). Compensation interpolator 114 may be implemented using any suitable type of interpolation circuit (e.g., a linear interpolation circuit, a polynomial interpolation circuit, etc.). In particular, based on the received per-pixel impact value and the pixel value to be compensated (e.g., pixel value 74 for a corresponding pixel in row 66-2), compensation interpolator 114 may generate a compensation value for the pixel value. The compensation value provided by compensation interpolator 114 may appropriately adjust the pixel value to counteract the inter-line and inter-phase toggling crosstalk impacting the programming of the pixel value.

If desired, the compensation value output from compensation interpolator 114 may be further adjusted by additional downstream compensation adjustment circuit(s) 116. These compensation adjustment circuit(s) 116 may perform any combination of adjustments such as pixel array location-based adjustments (e.g., applying a weight or scaling factor depending on the array location of the pixel to be loaded with the pixel value), general tunable adjustments (e.g., controllable by system or user input), a compensation toggle adjustment (e.g., to nullify the compensation value based on determining that compensation should not applied to the given pixel value), etc.

Compensation circuitry 76 may generally apply the resulting compensation value (e.g., the compensation value directly output from compensation interpolator 114 or after further processing by adjustment circuit(s) 116)) to the corresponding pixel value for which the compensation value is generated. In the example of FIG. 9, an adder circuit 118 in compensation circuitry 76 may receive the pixel value (e.g., the same pixel value provided to compensator interpolator 114) and the compensation value output from compensator interpolator 86 (optionally via adjustment circuit(s) 116) and sum the values to generate the corresponding compensated pixel value. Compensated pixel value(s) may be programmed into corresponding pixels of display 24 (e.g., with or without additional downstream processing of the compensated pixel values) during respective phases on shared data lines and using corresponding gate lines (e.g., as described in connection with FIGS. 3 and 4).

The components of compensation circuitry 76 (e.g., described in connection with FIGS. 6, 7, and 9) may be implemented in one or more integrated circuits such as microcontrollers, application-specific integrated circuits, or other types of processing circuitry with or without integrated memory, and memory or other data storage integrated circuits, may be implemented using discrete logic or other discrete components, may be implemented using one or more state machines, and/or any other suitable implementation).

The foregoing is merely illustrative and various modifications can be made to the described embodiments. The foregoing embodiments may be implemented individually or in any combination.

What is claimed is:

1. A display comprising:

a first pixel arranged in a first column of a pixel array;

a second pixel arranged in a second column of the pixel array;

a data line coupled to the first and second pixels; and display driver circuitry coupled to the data line, configured to perform pixel value loading for the first pixel using the data line, and configured to perform pixel value loading for the second pixel using the data line, wherein the data line exhibits a toggling between a first pixel value to be loaded into the first pixel and a second pixel value to be loaded into the second pixel, wherein the display driver circuitry includes crosstalk compensation circuitry that performs compensation for crosstalk caused by the toggling between the first and second pixel values, and wherein the compensation is performed by generating a pixel value compensation value based on a difference between the first pixel value to be loaded into the first pixel and the second pixel value to be loaded into the second pixel.

2. The display defined in claim 1, wherein the first pixel is arranged in a first row of the pixel array and the second pixel is arranged in a second row of the pixel array, wherein the display driver circuitry is configured to perform pixel value loading for the first pixel using the data line during a first line time period associated with the first row, and wherein the display driver circuitry is configured to perform pixel value loading for the second pixel using the data line during a second line time period associated with the second row.

3. The display defined in claim 2, wherein the toggling between the first and second pixel values comprises an inter-line toggling from the first pixel value to the second pixel value that occurs between the first and second line time periods and wherein the crosstalk compensation circuitry generates the pixel value compensation value based on the inter-line toggling.

4. The display defined in claim 3, wherein the crosstalk compensation circuitry comprises a reordering circuit that receives a first set of pixel values for the first row and receives a second set of pixel values for the second row and wherein the reordering circuit identifies the first pixel value from the first set of pixel values and the second pixel value from the second set of pixel values.

5. The display defined in claim 1, wherein the first and second pixels are arranged in a row of the pixel array, wherein the display driver circuitry is configured to perform pixel value loading for the first pixel using the data line during a first programming phase of a line time period associated with the row, and wherein the display driver circuitry is configured to perform pixel value loading for the second pixel using the data line during a second programming phase of the line time period.

6. The display defined in claim 5, wherein the toggling between the first and second pixel values comprises an inter-phase toggling from the first pixel value to the second pixel value that occurs between the first and second programming phases and wherein the crosstalk compensation circuitry generates the pixel value compensation value based on the inter-phase toggling.

7. The display defined in claim 6, wherein the crosstalk compensation circuitry comprises a reordering circuit that receives a set of pixel values for the row and wherein the reordering circuit identifies the first pixel value from the set of pixel values and the second pixel value from the set of pixel values.

8. The display defined in claim 1, wherein the crosstalk compensation circuitry generates the pixel value compensation value based on inter-line toggling on a plurality of data lines and inter-phase toggling on the plurality of data lines.

9. The display defined in claim 8, wherein the crosstalk compensation circuitry generates the pixel value compensation value based on inter-line toggling for multiple rows in the pixel array and based on inter-phase toggling for the multiple rows in the pixel array.

10. The display defined in claim 9, wherein the pixel value compensation value is for a pixel value to be loaded into a given pixel in a given row and wherein the multiple rows comprise preceding rows with respect to the given row and succeeding rows with respect to the given row.

11. Display driver circuitry comprising:

a pixel value reordering circuit that reorders first and second streams of display pixel values for first and second corresponding rows of a display pixel array, respectively, and that identifies inter-line toggling pixel value pairs and inter-phase toggling pixel value pairs from the first and second streams of display pixel values, wherein the identified inter-line toggling pixel value pairs comprise a first pair of pixel values to be loaded into a first display pixel in the first row and into a second display pixel in the second row, respectively, using a data line, and wherein the identified inter-phase toggling pixel value pairs comprise a second pair of pixel values to be loaded into the second display pixel in the second row and into a third display pixel in the second row, respectively, using the data line; and compensation calculation circuitry that obtains the identified inter-line toggling pixel value pairs and inter-phase toggling pixel value pairs and that generates a compensation value for a display pixel value based on the first pair of pixel values and the second pair of pixel values.

12. The display driver circuitry defined in claim 11, wherein the inter-line toggling pixel value pairs include pixel values from the first and second streams of display pixel values and wherein the inter-phase toggling pixel value pairs include pixel values from the second stream of display pixel values.

13. The display driver circuitry defined in claim 11, wherein the pixel value reordering circuit reorders the second stream of display pixel values and a third stream of display pixel values for a third row of the display pixel array, and identifies additional inter-line toggling pixel value pairs and additional inter-phase toggling pixel value pairs from the second and third streams of display pixel values.

14. The display driver circuitry defined in claim 13, wherein the compensation calculation circuitry generates the compensation value for the display pixel value based on the identified additional inter-line toggling pixel value pairs and additional inter-phase toggling pixel value pairs.

15. Display crosstalk compensation circuitry comprising:

a pixel value reordering circuit that reorders streams of pixel values for corresponding rows of a pixel array and that identifies toggling pixel value pairs from the streams of pixel values, wherein the identified toggling pixel value pairs include a toggling pixel value pair having a first pixel value to be loaded into a first pixel of a first column of the pixel array using a data line and having a second pixel value to be loaded into a second pixel of a second column of the pixel array using the data line;

a subtractor circuit that receives the toggling pixel value pairs and outputs pixel value pair difference values based on the toggling pixel value pairs;

toggling calculation circuitry that receives the pixel value pair difference values and outputs toggling impact values based on the pixel value pair difference values; and interpolation circuitry that receives the toggling impact values and outputs a compensation value for a pixel value.

16. The display crosstalk compensation circuitry defined in claim 15, wherein the toggling pixel value pairs comprise inter-phase toggling pixel value pairs, wherein the pixel value pair difference values comprise difference values for the inter-phase toggling pixel value pairs, and wherein the toggling calculation circuitry comprises inter-phase toggling calculation circuitry.

17. The display crosstalk compensation circuitry defined in claim 16, wherein the toggling pixel value pairs comprise inter-line toggling pixel value pairs, wherein the pixel value pair difference values comprise difference values for the inter-line toggling pixel value pairs, and wherein the toggling calculation circuitry comprises inter-line toggling calculation circuitry.

18. The display crosstalk compensation circuitry defined in claim 17, wherein the toggling calculation circuitry includes a pre-line calculation circuit coupled to the inter-line toggling calculation circuitry and the inter-phase toggling calculation circuitry, a post-line calculation circuit coupled to the inter-line toggling calculation circuitry and the inter-phase toggling calculation circuitry, and a summation circuit that is coupled to the pre-line calculation circuit and the post-line calculation circuit and that generates the toggling impact values.

19. The display crosstalk compensation circuitry defined in claim 15, wherein the toggling impact values comprise pixel-group-specific impact values and wherein the interpolation circuitry comprises a location interpolation circuit that outputs a pixel-specific impact value based on the pixel-group-specific impact values.

20. The display crosstalk compensation circuitry defined in claim 19, wherein the interpolation circuitry comprises a compensation value interpolation circuit that receives the pixel-specific impact value and the pixel value for compensation and generates the compensation value based on the pixel-specific impact value and the pixel value.

* * * * *